United States Patent [19]
Fujii et al.

[11] Patent Number: 5,477,338
[45] Date of Patent: Dec. 19, 1995

[54] FACSIMILE APPARATUS

[75] Inventors: Yoshiharu Fujii, Sakurai; Takako Nakayama, Osaka, both of Japan

[73] Assignee: Sharp Kabushiki Kaisha, Osaka, Japan

[21] Appl. No.: 5,362

[22] Filed: Jan. 19, 1993

[30] Foreign Application Priority Data

| Jan. 21, 1992 | [JP] | Japan | 4-008256 |
| Jan. 30, 1992 | [JP] | Japan | 4-015344 |
| Jan. 30, 1992 | [JP] | Japan | 4-015345 |

[51] Int. Cl.$^6$ .............. H04N 1/00; H04N 1/32
[52] U.S. Cl. ............ 358/400; 358/468; 358/406
[58] Field of Search ............... 358/400, 401, 358/403, 404, 406, 434, 435, 436, 438, 439, 468, 474; 379/100

[56] References Cited

U.S. PATENT DOCUMENTS

| 4,524,393 | 6/1985 | Ohzeki | 358/438 |
| 4,733,303 | 3/1988 | Koshiishi | 358/400 |
| 4,994,926 | 2/1991 | Gordon et al. | 358/400 |
| 5,027,386 | 6/1991 | Hisano | 379/100 |
| 5,061,916 | 10/1991 | French | 358/400 |
| 5,216,517 | 6/1993 | Kinoshita et al. | 358/403 |
| 5,241,403 | 8/1993 | Ishikawa | 358/400 |

FOREIGN PATENT DOCUMENTS

| 0429048 | 5/1991 | European Pat. Off. | H04N 1/00 |
| 3327905 | 2/1984 | Germany | H04N 1/32 |
| 3-162056 | 7/1991 | Japan | H04N 1/00 |
| 3-162064 | 7/1991 | Japan | H04N 1/00 |

OTHER PUBLICATIONS

U.S. Application Serial No. 07/921,059, filed Jul. 29, 1992.
Patent Abstracts of Japan, vol. 10, No. 20, Jan. 1986 & JP-A-60 178 767 (Canon) (Abstract).
Patent Abstracts of Japan, vol. 7, No. 156, Jul. 1983 & JP-A-58 066 967 (Fuji Xerox) (Abstract).
Patent Abstracts of Japan, vol. 14, No. 551, 7 Dec. 1990, & JP-A-22 35 074 (Sharp) (Abstract)
EPO Search Report.

Primary Examiner—Edward L. Coles, Sr.
Assistant Examiner—Jerome Grant, II
Attorney, Agent, or Firm—Nixon & Vanderhye

[57] ABSTRACT

A facsimile apparatus is disclosed capable of manually transmitting information about its operating state to the control device. If trouble not detectable by an internal detector occurs, or trouble not transmitted automatically arises, information about the trouble can be transmitted to a remote control device by a key input operation in the operating part of the facsimile apparatus. At this time, the facsimile functions, except for the controller and communication controller in the facsimile apparatus, so that occurrence of new troubles due to manipulations made before a stop cancel signal from the control device is received may be prevented.

7 Claims, 6 Drawing Sheets

FACSIMILE APPARATUS

BACKGROUND OF THE INVENTION

1. Field of the Invention

The present invention relates to a facsimile apparatus for transmitting various information necessary for maintenance and control of electronic apparatus, such as facsimile apparatus and copier installed in office, through general public circuits networks.

2. Description of the Related Art

The facsimile apparatus is recently increasing in the type capable of forming images on plain paper by employing a copying process. The rate of troubles occurring in the mechanism employing such copying process is high. It is desired to strengthen the service organization for maintenance and control due to the necessity of periodic overhaul for maintenance of performance, and in particular quick and accurate countermeasures are keenly demanded in order to recover from troubles promptly.

In the conventional method of maintenance and control, generally, the facsimile apparatus itself detects its own condition, and indicates the nature of trouble or coming of replacement timing of specific parts by its display or the like, or displays the nearly empty state of consumable parts (indicating the consumable parts are about to end) to tell the user. The user recognizes the state, and if judging it necessary to call serviceman, it is reported to the maintenance service station assigned for maintenance and control of the facsimile apparatus by telephone or other means.

Such telephone communication, however, gives rise to the following problems.

(1) The user cannot do his own work when explaining the trouble, and loses time.
(2) The user may misunderstand the trouble message, and wrong information may be transmitted to the maintenance service station.
(3) The user may not notice the trouble message, and in such a case a minor trouble may be promoted to a major trouble.
(4) The maintenance service station sends the serviceman by preparing necessary repair parts after receiving the report from the user, and prompt countermeasure is difficult.

It is hence lately proposed to do maintenance and control in a method in which the user side facsimile detects its own operating state, converts the detected data to communication information, sends it automatically (or according to a transmission request from the maintenance service station) to a maintenance service station. The station receives the transmitted communication information, converts it, for example, into character information and prints out to recognize the operating state of the user side facsimile. (See, e.g., Japanese Patent Application Hei. 1-302749).

When executing such method of maintenance and control, in the first place, the user must install the facsimile apparatus possessing such function for transmitting the operating state. Then the serviceman goes to the office of the user to agree to a contract, and negotiates the term of the maintenance control for the facsimile apparatus with the user. Upon agreement, the serviceman manually sets the opening information for activating the function on the facsimile apparatus having the function of automatic transmission of the operating state.

The opening information includes what maintenance function should be selected, that is, what type of information is to be sent to the maintenance service station, information about the subscribed facsimile apparatus such as the apparatus name, subscriber's name and number, and the telephone number of the maintenance service station, that is, the information transmission destination.

In this facsimile apparatus, only the information about the operating state of the apparatus detected according to the function selected and set by the opening information is automatically transmitted to the maintenance service station. Accordingly, in the event of a trouble failing to transmit automatically to the maintenance service station, or a trouble out of the scope of the maintenance control service, the user must report to the maintenance service station by telephone or other means, and hence the same problems as mentioned above may occur.

SUMMARY OF THE INVENTION

It is hence a primary object of the invention to present a facsimile apparatus capable of transmitting information about the operating state to the control device if the operating state is not detected.

It is another object of the invention to present a facsimile apparatus capable of manually transmitting the information about the operating state to the control device.

To achieve the above objects, the invention presents a facsimile apparatus comprising:

facsimile communication means for transmitting and receiving image data through a public circuit network, means for recording image data in recording paper, means for reading the document optically and converting into image data, means for detecting the operating states of at least the facsimile communication means, recording means and reading means, and operating state transmitting means for transmitting the information about the detected operating state to a control device for controlling the operating state through a public circuit network, thereby transmitting the information about the operating state to the control device automatically when the operating state is detected, wherein the apparatus further comprises information input means for receiving the information to be transmitted to the control device, and input information transmitting means for transmitting the information received by the information input means to the control device.

In the invention, the recording means records the information entered by the information input means in recording paper.

Also in the invention, the facsimile apparatus comprises a memory for storing the information received by the information input means.

According to the invention, the information to be transmitted entered through the information input means is transmitted to the control device by the input information transmission means, Thus, to the control device, not only the information about the operating state to be detected by the operating slate detecting means, but also the information about the operating state not detected by the operating state detecting means is also transmitted. Therefore, in the event of a trouble out of the scope of the maintenance control service, for example, by the key input operation by the operator, the information about the trouble may be transmitted to the maintenance service station.

Also according to the invention, the information entered by the information input means is recorded in recording paper through recording means. Therefore, the user of the facsimile can easily recognize the information transmitted to the control device.

Moreover, according to the invention, the information entered through the information input means is stored in the memory. Therefore, in the facsimile apparatus possessing the display means, for example, if not able to record by the recording means, the stored information can be shown in the display means. Furthermore, by reading out the information stored in the memory as required, the information may be recorded in the recording paper when it becomes possible to record by recording means.

Thus, in the invention, even the information other than the information about the operating state detected by the operating state detecting means can be transmitted to the control device. Therefore, if a trouble out of the service scope of maintenance control should occur, the information may be transmitted to the maintenance service station without report by telephone or the like, so that the convenience and utility of the facsimile apparatus may be enhanced.

Also according to the invention, the information to be transmitted is printed out in recording paper by the recording means. Therefore, the user of the facsimile apparatus can easily recognize what information has been transmitted.

Moreover according to the invention, the information to be transmitted is stored in the memory, may be displayed as desired, for example, in display means. Therefore, the user of the facsimile apparatus can easily recognize what information has been transmitted.

The invention also presents a facsimile apparatus comprising:

communication means for transmitting and receiving various signals including image data through a public circuit network, means for recording image data in recording paper, reading means for reading the original optically and converting into image data, operating state detecting means for detecting the operating state of at least the communication means, recording means and reading means, and operating state transmitting means for transmitting the information about the detected operating state through a public circuit network to a control device for controlling the operating state, thereby transmitting the information about the detected operating state automatically to the control device when the operating state is detected, wherein the apparatus further comprises information input means for receiving the information to be transmitted to the control device, input information transmission means for transmitting the information entered through the information input means to the control device, and control means for inactivating means other than the communication means after transmission of the information by the input information transmission means.

The invention is characterized by the control means which activates the inactivated means when receiving a predetermined cancel signal from the control device by the communication means.

The invention is also characterized by the control means which stores the information showing that the cancel signal from the control device has been received.

According to the invention, the information entered through the information input means is transmitted to the control device by the input information transmission means. That is, to the control device, the information not detected by the operating state detecting means or the information not transmitted automatically can be transmitted. At this time, the control means inactivates other means than the communication means after the information is transmitted to the control device. Accordingly, for example, if the information transmitted to the control device is the information about troubles of various means of the facsimile apparatus, problems of causing new troubles can be eliminated by disabling the defective facsimile apparatus by the control means.

Moreover, according to the invention, the means inactivated by the control means can be activated by receiving a predetermined cancel signal from the control device by the communication means. Hence, if the facsimile apparatus is disabled due to trouble or the like, by making it usable again by the control means, the control of the operating state such as remote diagnosis and repair from the control device can be done efficiently.

Also according to the invention, the control means, when receiving a cancel signal from the control device, stores the information showing that the cancel signal has been received. As a result, the operator can easily recognize, for example by printing out by printing means, a series of actions in the facsimile apparatus once inactivated and then activated again.

Thus, in the invention, even in the state not detected by the operation detecting means, the information concerning the operating state can be transmitted to the control device. Hence, if a trouble out of the scope of the maintenance control service should occur in the facsimile, the information concerning the trouble can be transmitted to the control device, thereby eliminating the bothering task of reporting to the maintenance service station through telephone or the like by the operator as required in the prior art.

Besides, after the occurrence of such trouble, that is, after transmission of the information concerning the operating state, means other than the communication means of the facsimile apparatus can be inactivated. As a result, the problem of increasing the troubles by manipulation of the defective facsimile apparatus by the operator can be avoided. At the same time, consecutive transmission of the information to the control device due to mistake or abuse may be eliminated, too.

According to the invention, the inactivated function in the facsimile apparatus can be canceled or activated by the control device. Hence, for example, after the occurrence of such trouble, it is reported from the facsimile apparatus causing the trouble to the maintenance service station by telephone or the like, and at the same time the processing from the control device such as remote diagnosis can be done easily and efficiently. Thus, the control device can instantly judge the type of the information transmitted from the facsimile apparatus, so that wrong information or transmission by abuse can be easily judged.

In the invention, moreover, the cancel signal or other information received from the control device is read out, for example, by an arbitrary key operation by the operator, and is easily displayed to the operator. As a result, a series of process after outbreak of the trouble in the facsimile apparatus can be printed out as a result table or the like, so that it can be easily recognized later.

The invention moreover presents a facsimile apparatus comprising:

facsimile communication means for transmitting and receiving image data through a public circuit network, a telephone set for transmitting and recording voice signals through a public circuit network, changeover means for connecting the public circuit network either to the facsimile communication means or to the telephone set, means for recording the image data in recording paper, means for reading the original optically and converting to image data, operating state detecting means for detecting the operating state of at least the facsimile communication means, recording means, and reading means, and operating state transmitting means for transmitting the information about the detected operating state through the public circuit network to a control device for controlling the operating state, thereby transmitting the information about the operating state to the control device automatically when the operating state is detected, wherein the apparatus further comprises information input means for receiving the information to be transmitted to the control device, input information transmission means for transmitting the information received by the information input means to the control device, and control means for changing over the changeover means by force to connect the public circuit network to the telephone set, responding to the changeover signal from the control device, after transmission of information to the control device by the input information transmission means.

According to the invention, when the information to be transmitted is entered by the information input means, it is transmitted to the control device by the information transmission means. That is, to the control device, even the information not detected by the operating state detecting means or the information not transmitted automatically can be transmitted. Besides, after transmission of information to the control device, when a changeover signal is received from the control device, the changeover means is changed over by force by the control means, and the public circuit network is connected to the telephone set. Therefore, for example, if the information about the trouble occurring in the facsimile apparatus is entered by the information input means, when making a so-called answer call as telephone report from the control device side to the facsimile apparatus side for confirming about the trouble, the public circuit network is connected to the telephone set by force after transmission of information to the control device, and hence if the public circuit network is connected, for example, to the facsimile communication means by the changeover means, the answer call is made normally.

Thus, according to the invention, even the operating state that is not detected by the operating state detecting means, the information about the operating state can be transmitted to the control device. Hence, even in the facsimile apparatus, for example, the information about trouble can be transmitted to the control device, and the bothering operation of reporting to the maintenance service station by telephone or the like by the operator as required in the prior art may be eliminated. Incidentally, if the public circuit network is connected to the facsimile communication means, that is, if the facsimile apparatus is set in the image data reception mode, the answer call which is a telephone report from the control device can be normally done. Therefore, if a trouble should occur in the facsimile apparatus, for example, the trouble may be always predicted or confirmed adequately by the answer call from the control device.

BRIEF DESCRIPTION OF THE DRAWINGS

Other and further objects, features, and advantages of the invention will be more explicit from the following detailed description taken with reference to the drawings wherein.

DETAILED DESCRIPTION OF THE INVENTION

Figure 1:
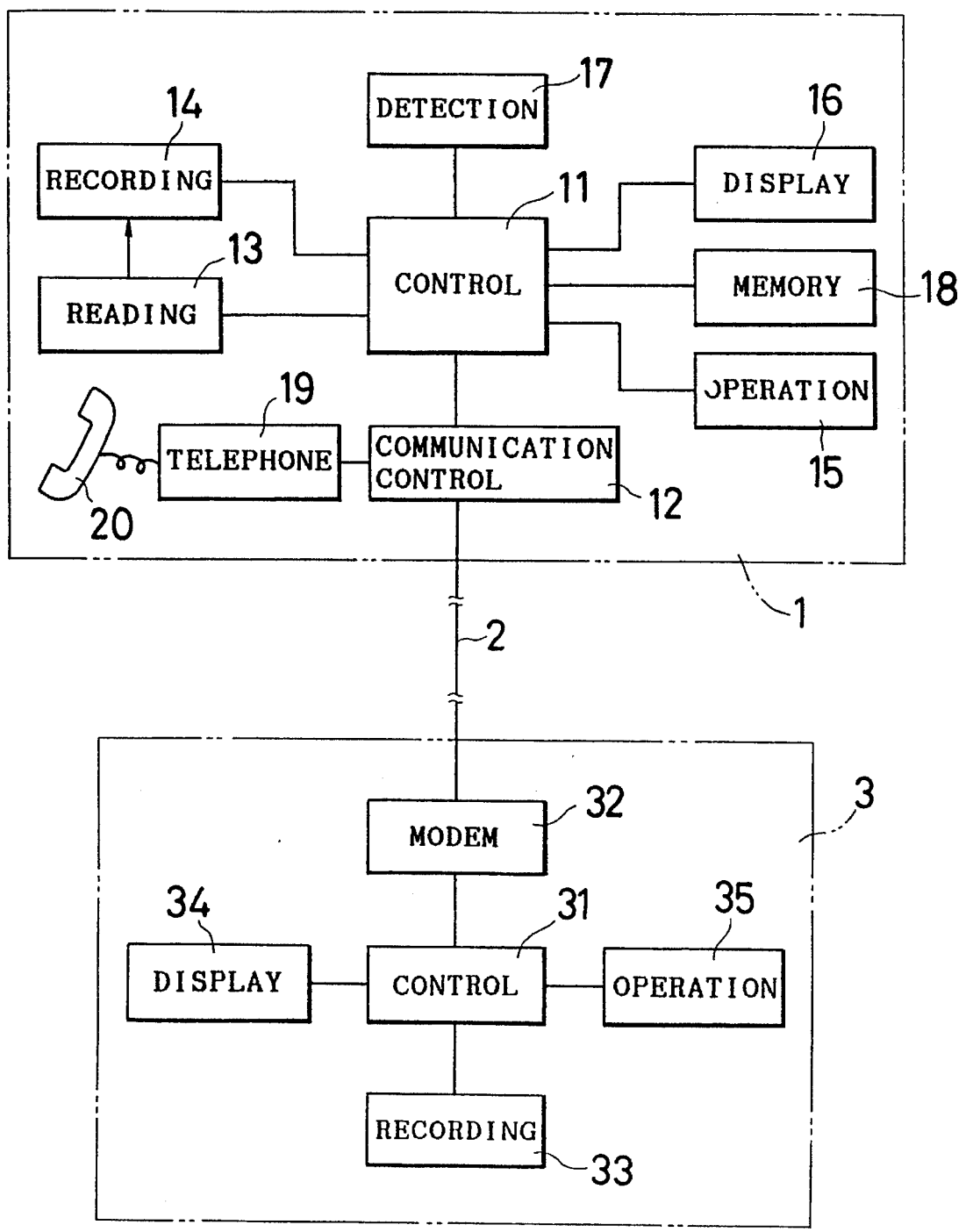
FIG. 1 is a block diagram showing a basic composition of a facsimile apparatus 1 in an embodiment of the invention.
Figure 2:
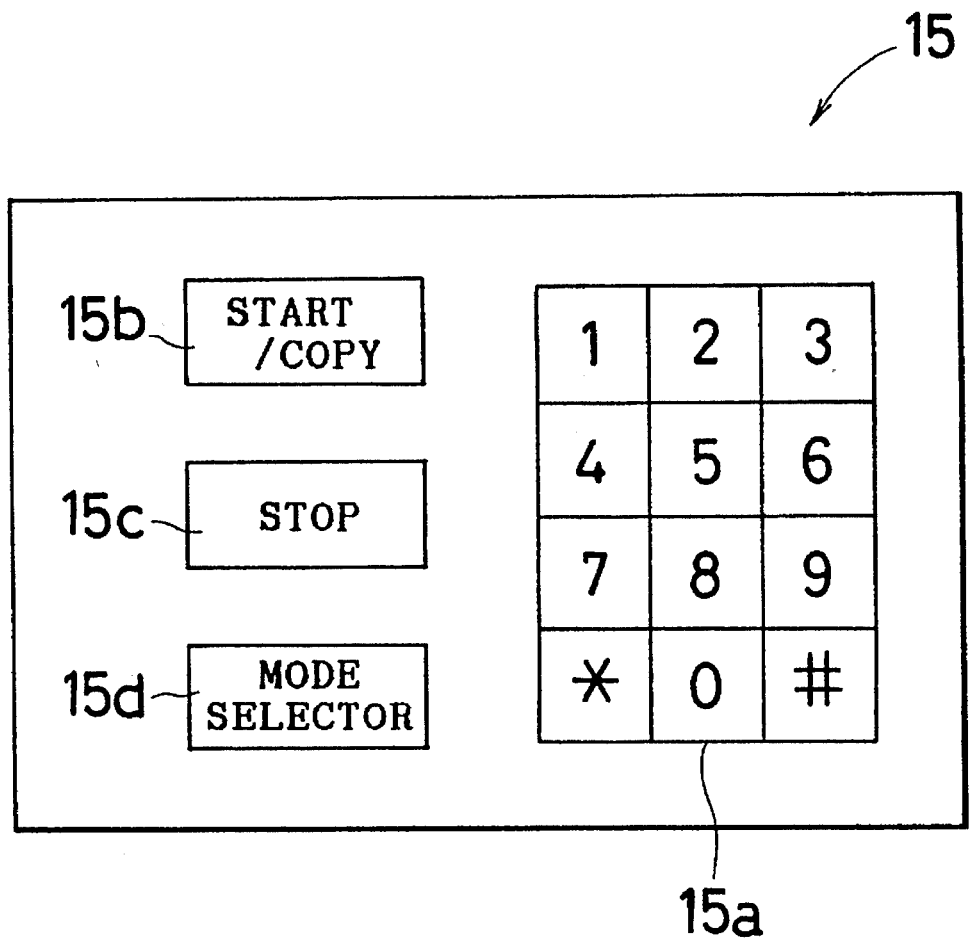
FIG. 2 is a plan view of an operating part 15.

Now referring to the drawing, preferred embodiments of the invention are described below.

FIG. 1 is a block diagram showing a basic composition of a facsimile apparatus 1 in an embodiment of the invention. The facsimile apparatus 1 is connected to a telephone circuit network 2, and image data is transmitted and received with other facsimile apparatus, and various information can be transmitted and received with a control device 3 which is described later through the telephone circuit network 2. The facsimile apparatus 1 executes an electrostatic copying process of forming a charged image and recording (transferring) on recording paper.

The facsimile apparatus 1 comprises a controller 11 realized by a microcomputer or the like, and the controller 11 is connected with a communication controller 12, a reading part 13, a recording part 14, and operating part 15, a display part 16, a detector 17, and a memory 18. The communication controller 12 comprises an incoming detecting circuit, a modem and other standard features. The communication controller demodulates the received image data, applies the demodulated image data to the controller 11. In addition, the communications controller modulates image data to be transmitted and delivers to the telephone circuit network 2. The reading part 13 comprise a CCD (charge coupled device) mentioned below, lens, exposure device and other features. The reading part optically reads a document to be transmitted, and converts into electric signals (image data) and applies the data to the controller 11. When copying a document, the document is exposed, and the document image is focused on a photoreceptor surface of the recording part 14.

The recording part 14 comprises photoreceptor, developing device, charger, fixing device and other features. The recording part transfers the image onto the recording paper in the electrostatic copy process.

The operating part 15 comprises numeric keys and various function setting key as mentioned below. The display part 16 is realized by a liquid crystal display device or the like. The display part displays the input data from the operating part 15 and the operating state of the facsimile apparatus 1, such as the error information and the information showing a shortage of consumable parts.

The detector 17 detects the operating state of the facsimile apparatus 1, or more specifically an abnormal operating state, and applies the detected operating state to the controller 11. The controller 11 comprises trouble phenomenon judging means, trouble type judging means, and communication information converting means which are not shown, and these means operate according to the control from the detector 17.

The trouble phenomenon judging means judges the nature of the trouble on the basis of the information detected by the detector 17. The trouble type judging means judges if the trouble indeed by the trouble phenomenon judging means is of the type requiring the so-called serviceman call or not. In the case of the trouble of the type not requiring the serviceman call, it means a trouble that can be relatively easily handled by the user, such as paper jamming and shortage of recording paper. The trouble of the type requiring the serviceman call is, for example, the end of life of the photoreceptor in the recording part 14 that cannot be handled by the user.

The memory 18 comprises ROM (read-only memory) and RAM (random access memory), among others, and the ROM stores the programs for controlling the actions of the facsimile apparatus 1, and the RAM incorporates a registration region of opening information transmitted from the control device 3, and a work region used in processing action by the controller 11, among others. In the memory 18, the Information to be transmitted to the control device 3 by the operating part 15 is also stored.

The telephone circuit 19 comprises a handset 20, and is connected to the communication controller 12, and is a circuit for realizing communication with the control device 3 and other telephone set or the like.

The control device 3 is a device basically composed of a so-called personal computer, and it transmits and receives data with the facsimile apparatus 1 or other terminal device through the telephone circuit network 2. The control device 3 comprises a controller 31 composed of CPU (central processing unit) and others, and the controller 31 is connected with a modem 32, a recording part 32, a display part 34, and an operating part 35.

The modem 32 demodulates the received data and applies the received data to the controller 31, and modulates the transmit data to be transmitted given from the controller 31, and delivers the transmit data to the telephone circuit network 2. The recording part 33 is realized by a thermal printer or the like, and records the image data received through the telephone circuit network 2, various received information, or the information entered through the operating part 35 in recording paper such as thermal recording paper. The display part 34 is realized by the liquid crystal display, cathode-ray tube (CRT), or the like, and displays the information received through the telephone circuit network 2 and the information entered through the operating part 35. The operating part 35 comprises plural key switches such as numeric keys and various function setting keys for specifying the operating state of the control device 3.

Fig, 2 is a plane view of the operating part 15. The operating part 15 comprises numeric keys 15a for entering the destination telephone number of the like at the time of calling, a start/copy key 15b for starting transmission of image data or printing the communication result table or the like by the recording part 14, a stop key 15c for stopping transmission of image data, and a mode selector key 15d for selecting various functions such as the mode for receiving the image data (hereinafter called tax mode) and the mode for receiving voice signal (hereinafter called telephone mode). In this embodiment, of various information transmitted to the control device 3, the information other than the data relating to the operating state detected by the detector 17, that is, the information about troubles out of the maintenance service scope on the basis of the preset opening information can be arbitrarily transmitted by the operator by pressing, for example, the "*" key of the mode selector key 15d and numeric keys 15a.

Figure 3:
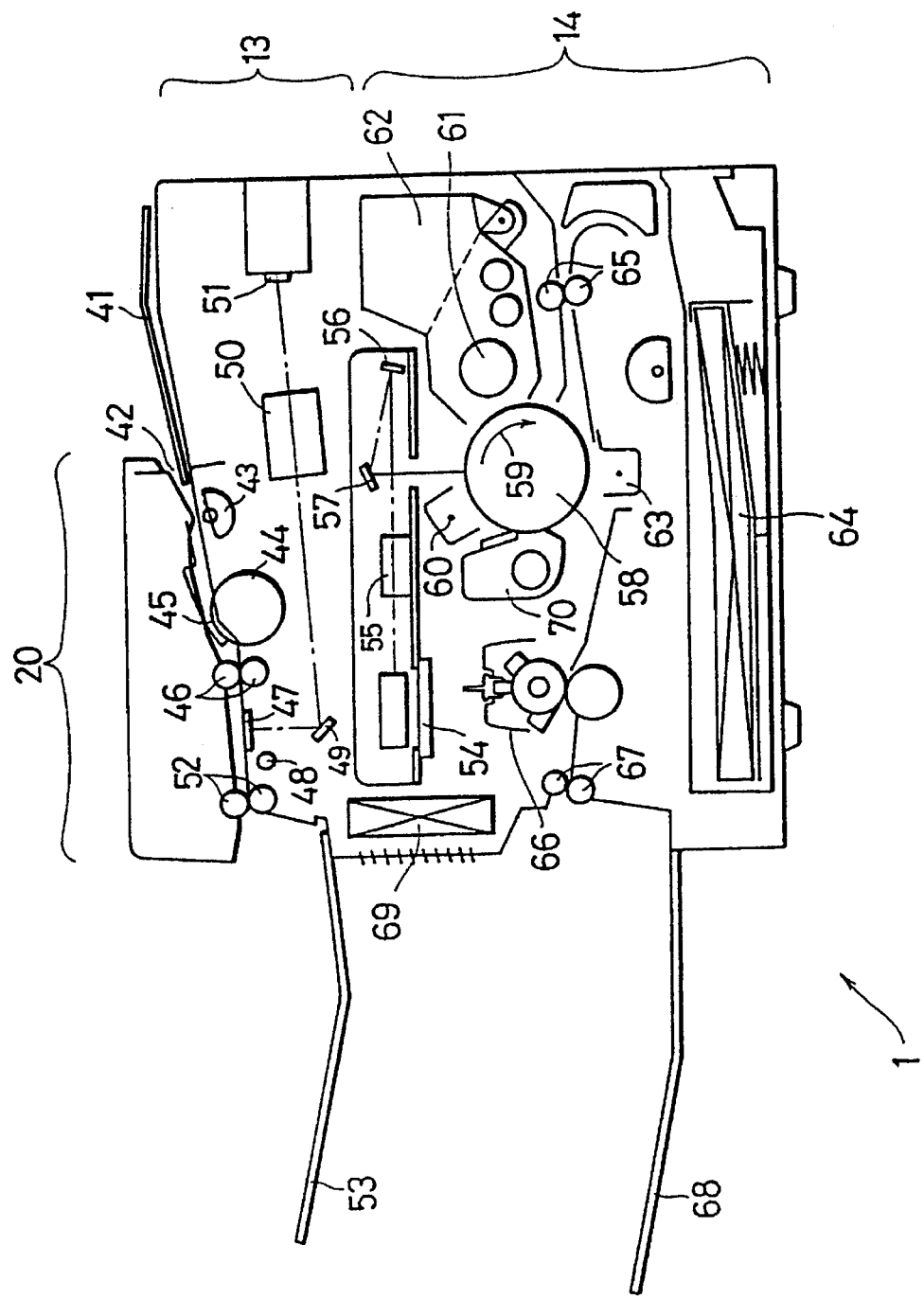
FIG. 3 is a sectional view showing the constitution of the facsimile apparatus 1.

FIG. 3 is a sectional view showing the construction of the facsimile apparatus 1. The facsimile apparatus 1 is roughly divided into the reading part 13, recording part 14, and document conveying part 19. When the document 41 is inserted into a document inlet 42, setting of the document 41 is detected by a document detecting sensor 43 realized by a microswitch or the like. Later, when the copy key which is not shown or the start/copy key 15b for starting the transmission of the image data is manipulated by the operator, the conveying action of the document 41 is started.

When transmitting the document, the document 41 is pressed and conveyed by a roller 44 and a pressing member 45, and is further conveyed into an exposure region in which a transparent glass 47 is instaled by a pair of conveying rollers 46. In the exposure region, irradiation light from a light source 48 is emitted to the original plane of the document 41, and its reflected light enters the CCD 51 through mirror 49 and lens 50. By the CCD 51, the incident light is converted into an electrical signal (image data), and is given to the controller 11. The document 41 after exposure is conveyed by a pair of discharge rollers 52, and is discharged onto a document tray 53.

At the downward side of the mirror 49 in FIG. 3, an exposure head 54 is disposed, and when copying the document 41, an electrostatic copy process is executed along with the document conveying action. The document image exposed by the exposure head 54 is focused on a photosensitive drum 58 through lens 55 and mirrors 56, 57.

The photosensitive drum 58 is rotated in the direction of arrow 59. The surface of the photosensitive drum 58 is uniformly charged by a corona charger 60. Next, the other parts than the document image are illuminated with light by the exposure head 54, and the electric charge of the illuminated area is removed, and the charge is left over in the document image area, thereby forming an electrostatic latent image. In a developing part 61, a toner composed of coloring particles charged in the reverse polarity of the electrostatic latent image is supplied from a toner cartridge 52, and it is deposited on the electrostatic latent image to form a toner image. Consequently, the recording paper is laid over this toner image, and the electric charge in the reverse polarity of the charge polarity of the toner is applied on the recording paper by a transfer device 63 from the opposite side of the photosensitive drum 58 of the recording paper, and the toner image is transferred on the recording paper by the electrostatic force.

The recording paper is stored in a recording paper cassette 64, and is conveyed in a conveying route by paper feed roller or the like not shown herein, and is supplied into a transfer region in which the transfer device 63 is installed by the paper feed roller 65.

The toner image transferred on the recording paper is fixed on the recording paper by applying heat or pressure by a fixing device 66. On the other hand, the latent image charge on the photosensitive drum 58 after transfer is destaticized by a destaticizer 70. Besides, the residual toner left over on the photosensitive drum 58 without being transferred is removed by a cleaner which is not shown. By repeating this series of process from charging to cleaning, the document image is continuously copied on the recording paper.

The recording paper on which the toner image is fixed is conveyed by a discharge roller 67, and is discharged onto a discharge tray 68.

Near the exposure head 54, a cooling fan 69 is installed in order to cool off the heat of the exposure head 54.

Figure 4:
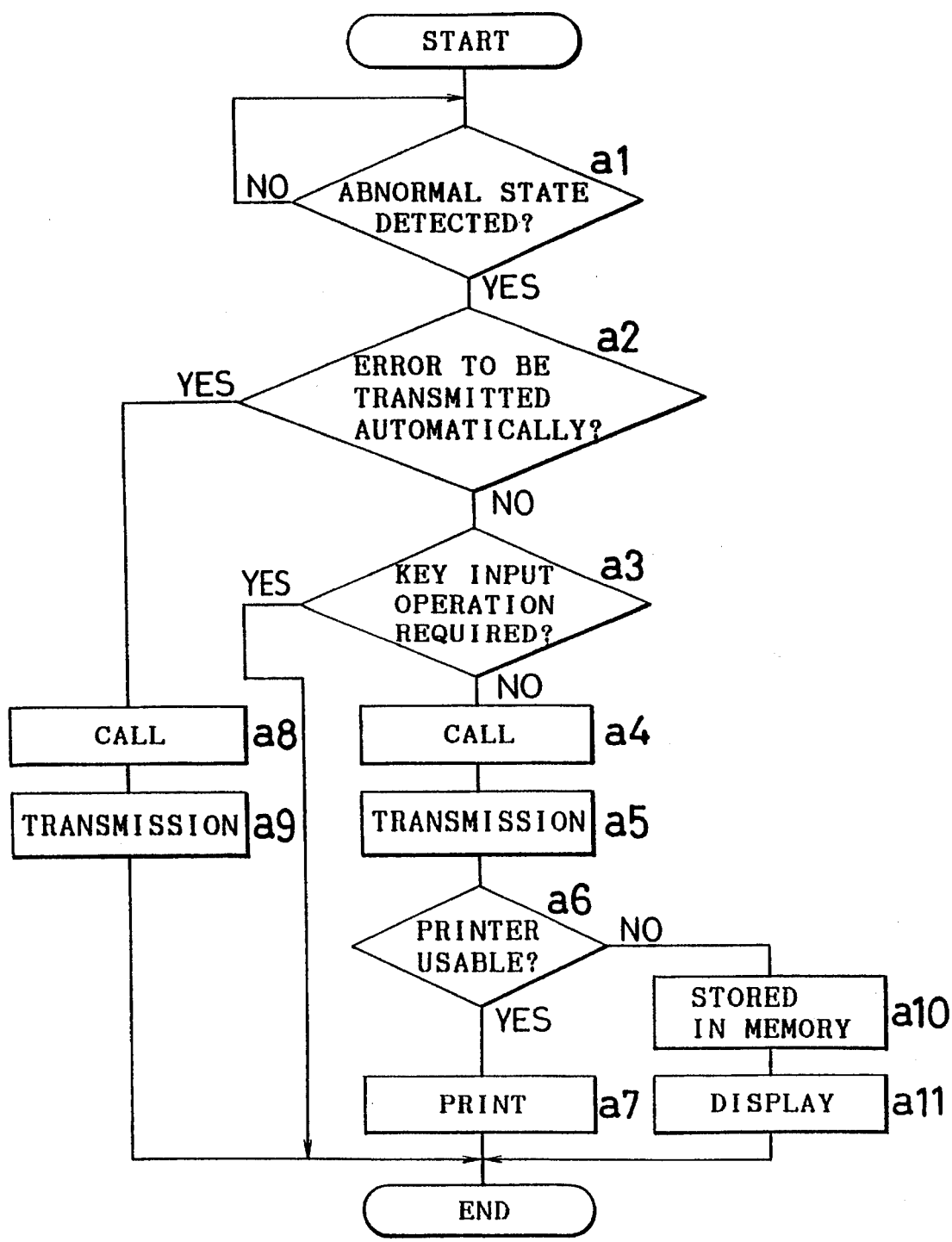
FIG. 4 is a flow chart for explaining the operation in transmission of information of the facsimile apparatus 1.

FIG. 4 is a flow chart explaining the operation of the facsimile apparatus 1 in the mode of information transmission. At step a1, when the operating state (abnormal state) is detected by the detector 17, it is judged by the controller 11, at step a2, whether it is necessary or not to automatically transmit the detected abnormal state. At step a2, if the detected abnormal state is not included in the maintenance service on the basis of the preset opening information, it is judged at step a3 whether the key input for the information transmission of the operating part 15 has been done or not. If the key input for information transmission has been done, the control device 3 is called at step a4, and the information of the signal showing the trouble or the like is transmitted at step a5. At step a3, if the key input operation has not been done, the operation is terminated.

At step a2, on the other hand, if the detected abnormal state is included in the maintenance service on the basis of the preset opening information, for example, a trouble such as end of life of the photosensitive drum 58, the control device 3 is called at step a8, and the detected abnormal state, that is, the information telling it necessary to replace the photosensitive drum 58 is transmitted at step a9, and the operation is terminated.

At step a6, it is judged whether the recording part 14 is usable or not. If usable, at step a7, the information transmitted at step a5 is printed on the recording paper to terminate the operation, and if unusable, for example, if the abnormal state detected at step a1 is related with the recording part 14, the information transmitted at step a10 is stored in the memory 18. At step a11, the stored information is delivered and displayed in the display part 16, and the operation is terminated.

Thus, according to the embodiment, even in the case of the information other than the information about the abnormal state of the facsimile apparatus 1 detected by the detector 17, that is, the information out of the scope of the maintenance service on the basis of the preset opening information, it is possible to transmit to the control device 3 by the key input operation by the operator. Hence, even if a trouble out of the scope of maintenance control of the facsimile apparatus should occur, the information about the trouble can be transmitted to the control device 3.

In addition, the transmitted information is printed out by the recording part 14, or stored in the memory 18, and delivered and displayed in the display part 16. Accordingly, the operator can visually recognize the transmitted information, so that the convenience and utility of the facsimile apparatus 1 may be enhanced.

Figure 5:
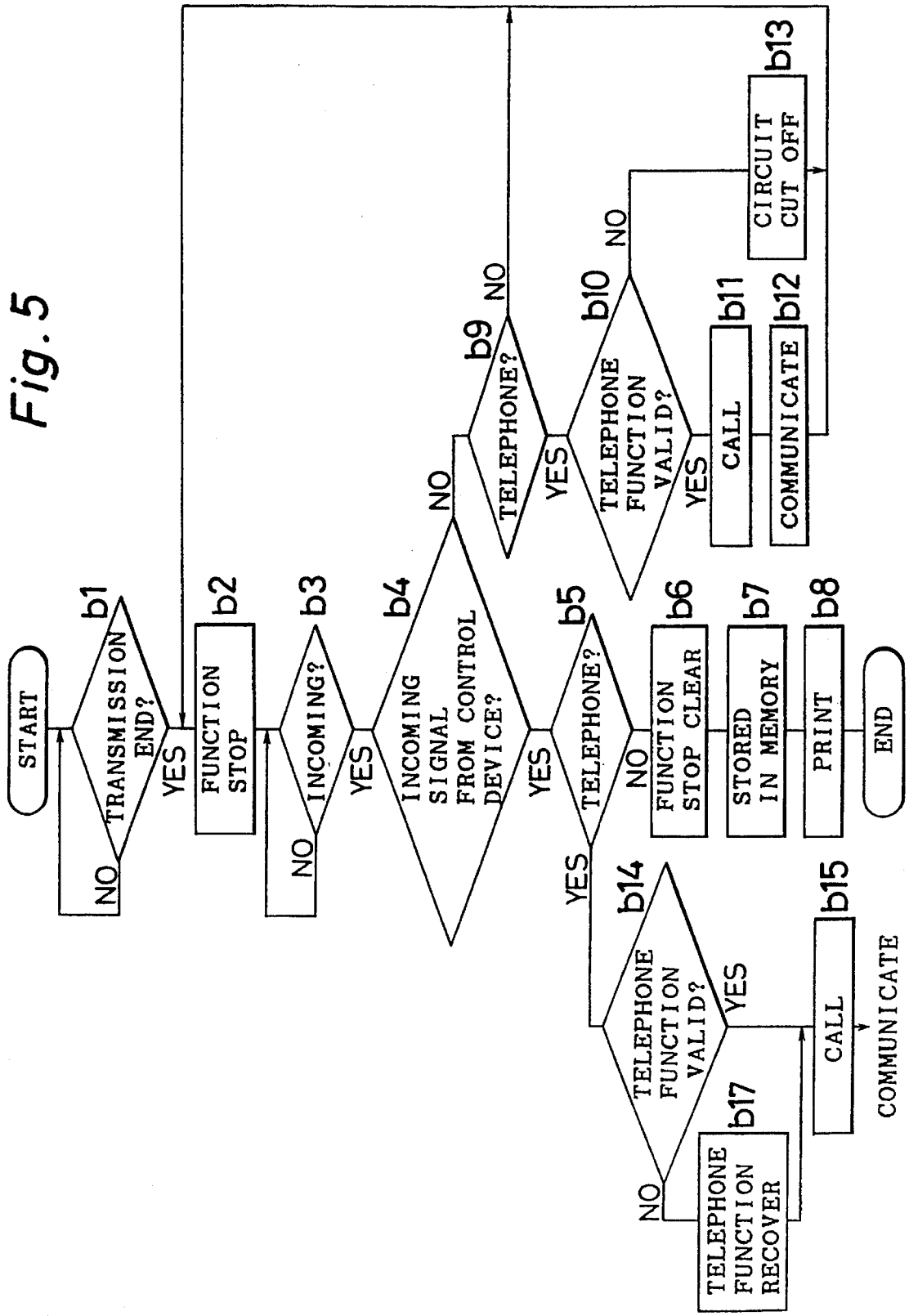
FIG. 5 is a flow chart for explaining the operation after transmission of information of the facsimile apparatus 1.

FIG. 5 is a flow chart explaining the operation after the information transmission mentioned above. The Information to be transmitted to the control device 3 is, meanwhile, not limited to the information transmitted by the key input operation alone, but includes the information about the operating state detected by the detector 17.

When transmission of information from the facsimile apparatus 1 to the control device 3 is over at step b1, the other functions than the controller 11 and communication controller 12 out of various functions of the facsimile apparatus 1, that is, the facsimile functions are stopped by the controller 11 at step b2. As a result, the key input operation from the operating part 15 by the operator, for example, is disabled. Even after stopping the functions, however, the image data signals from the telephone circuit network 2, the voice signals from other telephone set not shown herein, control signals such as cancel signal from the control device 3 described below are received by the communication controller 12, and the other signals than the image data signals out of them are operated according to the received signals.

When a signal is received at step b3, it is judged at step b4 whether the signal is a signal transmitted from the control device 3 or not. If judged to be a signal transmitted from the control device 3, it is further judged at step b5 whether it is a voice signal for requesting the call or not. If not a voice signal, at step b6, the controller 11 judges the received signal to be a cancel signal as a control signal for canceling the function stop, and cancels the function stop at step b2. At sled b7, the information showing that the cancel signal is received is stored as data in the memory 18, and is printed out by the recording part 14 as the so-called cancel result data on the basis of the stored data at step b8.

At step b4, if the incoming signal is not from the control device 3, advancing to step b9, it is judged to be a voice signal or not. If not a voice signal, returning to step b2, or at step b10 in the case of a voice signal, it is judged whether the telephone function is valid or not. In this embodiment, the functions stopped at step b2 are related to the facsimile function, but the functions to be stopped can be selected by the mode selector 15d, and it is judged whether the telephone function is valid or not at step b2.

At step b10, if the telephone function is valid, a ringing tone is cent out at step b11, and the call is made at step b12, and the operation returns to step b2 after the call service.

At step b10, if the telephone function is stopped, the circuit is cut off at step b13, and the operation returns to step b2. At step b5, if not a voice signal, it is judged at step b14 whether the telephone function is valid or not. When the telephone function is valid, advancing to step b15, or if the telephone function is stopped, the telephone function is restored at step b17 by receiving a changeover signal for recovering the telephone function from the control device 3 as described below, and a ringing tone is sent out at step b15, and the call is made. In this way, if the incoming signal is a voice signal from the control device 3, whether the telephone function is valid or invalid, it is sat in the call service state by force by the control signal from the control device 3.

Figure 6:
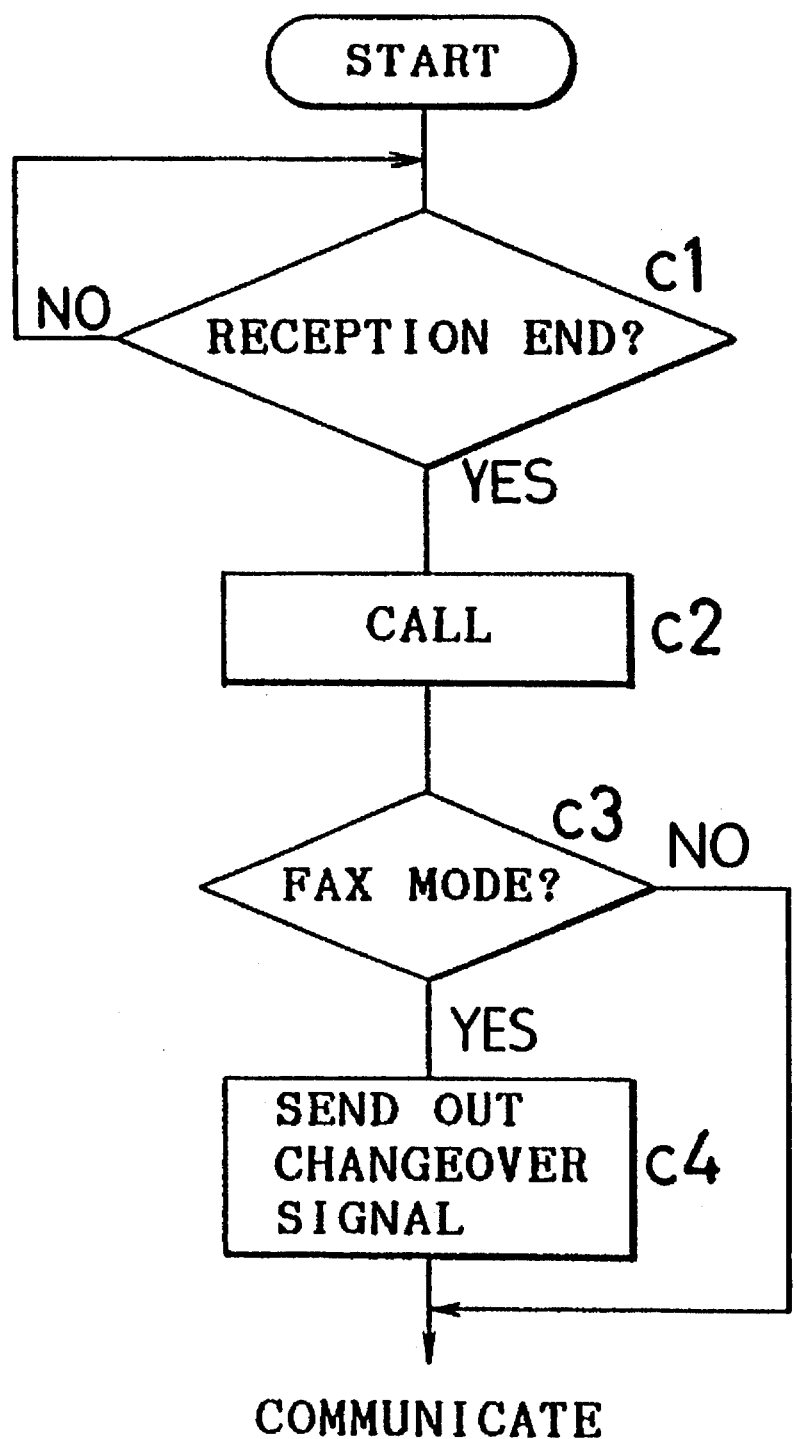
FIG. 6 is a flow chart for explaining the operation of a control device 3.

FIG. 6 is a flow chart for explaining the operation of the control device 3. Incidentally, FIG. 6 shows the action conducted by the control device 3 in order to recover the telephone function at step b17 in FIG. 5.

At step c1, when reception of the information from the facsimile apparatus 1 is over, the facsimile apparatus 1 is called for reply (answer call) at step c2. At step c3, it is judged whether the facsimile apparatus 1 is set in the fax mode by the mode selector 15d or not. In the case of the fax mode, at step c4, a mode changeover signal is sent out, and the telephone mode is selected by force by the controller 11, so as to exchange talk with the facsimile apparatus 1. At step c3, if not of the fax mode, that is, in the case of the telephone mode, the talk is made without the processing at step c4.

Thus, according to the embodiment, for example, if the reading parts 13 is defective and this trouble is not the operating state to be detected by the detector 17, the information about this trouble can be transmitted to the control device 3 by the key input operation through the operating part 15. At this time, after transmission of the information, since the facsimile functions are stopped by the controller 11, occurrence of new troubles is prevented. If the facsimile apparatus 1 is disabled due to this trouble, the apparatus is recovered in the usable state by the cancel signal received from the control device 3. Therefore, the maintenance control such as so-called remote diagnosis and repair from the control device 3 may be done efficiently.

Besides, the controller 11 stores the information showing the reception of the cancel signal from the control device 3 in the memory 18, and therefore by printing out the information by the recording part 14, for example, the process may be easily recognized.

According to the embodiment, when the control signal for changing over the circuit from the control device 3 is received in the communication controller 12, the controller 11 connects the telephone circuit network 2 to the telephone circuit 19 by force, and hence if the fax mode is preliminarily selected by the mode selector 15*d*, the answer call may be always made adequately.

The invention may be embodied in other specific forms without departing form the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile communication system comprising:

facsimile communication means for transmitting and receiving image data through a public circuit network, said facsimile communication means including:

recording means for recording image data on recording paper, recording means for reading a document optically and converting data read from the document into image data, docketing means for detecting operating states of at least the facsimile communication means, recording means and reading means, and operating state transmitting means for transmitting through a public circuit network information indicative of the detected operating states to a remote control means for controlling said operating states of said facsimile communication means, said operating state transmitting means transmitting the information about the operating states of said facsimile communication means to the remote control means automatically when the operating states are detected, wherein the facsimile communication means further comprises:

information input means for receiving input information regarding said facsimile communication means to be transmitted to the remote control means, and input information transmission means for transmitting to the remote control means input information received by the information input means to the remote control means.

2. The facsimile apparatus as claimed in claim 1, wherein the recording means records the input information entered by the information input means in recording paper.

3. The facsimile apparatus as claimed in claims 1 or 2, wherein said facsimile communication means further comprises a memory for storing the input information received by the information input means.

4. A facsimile apparatus comprising:

communication means for transmitting and receiving various signals including image data through a public circuit network, recording means for recording image data on recording paper, reading means for optically reading a document and converting information on the documents into image data, operating state detecting means for detecting an operating state of at least the communication means, recording means and reading means, and operating state transmitting means for transmitting state information about at least one of said operating states through a public circuit network to a remote control means for controlling at least one of said operating states, said operating state transmitting means transmitting the state information automatically to the remote control device when at least one of said operating states is detected, wherein the apparatus further comprises information input means for receiving input information to be transmitted to the remote control means, input information transmission means for transmitting the input information entered through the information input means to the remote control device, and internal control means for inactivating the means of said apparatus other than the communication means after transmission of the input information by the input information transmission means.

5. The facsimile apparatus as claimed in claim 4, wherein the internal control means activates the inactivated means when receiving by the communication means a predetermined cancel signal from the remote control means.

6. The facsimile apparatus as claimed in claim 5, wherein the internal control means stores the information showing that the cancel signal from the remote control means has been received.

7. A facsimile apparatus comprising:

facsimile communication means for transmitting and receiving image data through a public circuit network, a telephone set for transmitting and receiving voice signals through a public circuit network, changeover means for automatically connecting the public circuit network either to the facsimile communication means or to the telephone set, recording means for recording the image data on recording paper, reading means for reading an original document optically and converting image information on the document to image data, operating state detecting means for detecting the operating states of at least the facsimile communication means, recording means, and reading means, and operating state transmitting means for transmitting state information about the detected operating states through the public circuit network to a remote control means for controlling the operating states of said apparatus, wherein said facsimile apparatus further comprises information input means for receiving the state information to be transmitted to the remote control means, input information transmission means for transmitting the state information received by the information input means to the remote control means, and internal control means for activating the changeover means to connect the public circuit network to the telephone set, responding to a changeover signal from the remote control means acting after transmission of state information to the remote control means.

* * * * *